Feb. 24, 1953 W. H. JONES 2,629,411
CENTERING ATTACHMENT FOR MORTISING MACHINES
Filed Nov. 13, 1950 3 Sheets-Sheet 1

Inventor
William H. Jones

By Clarence A. O'Brien
and Harvey B. Jacobson
Attorneys

Feb. 24, 1953 W. H. JONES 2,629,411
CENTERING ATTACHMENT FOR MORTISING MACHINES
Filed Nov. 13, 1950 3 Sheets-Sheet 2

Inventor
William H. Jones

Feb. 24, 1953 W. H. JONES 2,629,411
CENTERING ATTACHMENT FOR MORTISING MACHINES
Filed Nov. 13, 1950 3 Sheets-Sheet 3

Inventor
William H. Jones

Patented Feb. 24, 1953

2,629,411

UNITED STATES PATENT OFFICE 2,629,411

CENTERING ATTACHMENT FOR MORTISING MACHINES

William H. Jones, Albuquerque, N. Mex., assignor of thirty-three per cent to W. Peter McAtee, Albuquerque, N. Mex.

Application November 13, 1950, Serial No. 195,383

5 Claims. (Cl. 144—84)

This invention relates to new and useful improvements in mortising and routing machines and more specifically to a guide and centering device for the bit or tool of a mortising or routing machine.

The primary object of the present invention is to provide a combined vise and drill holder and guide that will effectively grip a piece of work and center the work as a drill or tool carried by a mortising machine is guided toward the work.

Another important object of the present invention is to provide a centering device consisting of a work clamp, a combined tool holder and guide mechanism slidably carried by the clamp and a simple leverage means whereby the holder and guide mechanism may be moved toward the clamp to efficiently work an article held by the clamp.

Yet another object of the present invention is to provide a device of the aforementioned character including a gauge means whereby the distance of travel of the holder and guide mechanism will be readily visible to the operator and whereby the depth cut or drill may be limited.

Another object of the present invention is to provide a device for holding an article of work and for also holding and guiding a drill or tool and which is quickly and readily adjustable to accommodate work pieces of various widths.

A further object of the present invention is to provide a centering device for mortising machines including a pair of slidably connected members for clampingly engaging a work piece therebetween and a novel and improved means for urging the members into clamping engagement.

A still further aim of the present invention is to provide a centering device that is simple and practical in construction, strong and reliable in use, efficient and durable in operation, small and compact in structure, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 5 (sheet 2) is an enlarged detail vertical sectional view taken substantially on the plane of section line 5—5 of Figure 1.

Figure 1:
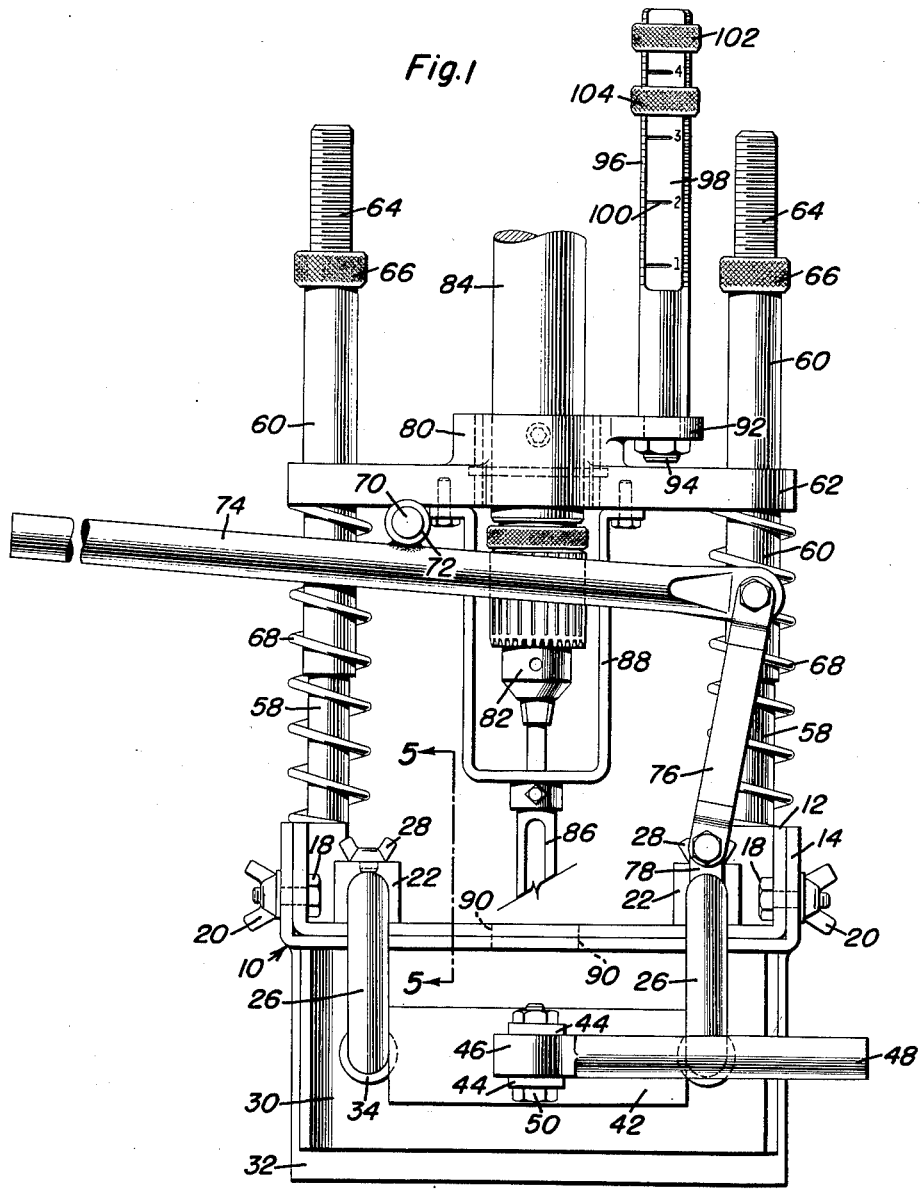
Figure 1 is a front elevational view of the present invention.

Referring now to the drawings in detail, wherein for the purpose of illustration, there is disclosed a preferred embodiment of the present invention, the numeral 10 represents a base member composed of inner and outer channels 12 and 14. The side flanges or leg portions of the channels 12 and 14 are provided with registering slots 16 that receive the threaded shanks of headed fasteners 18. The heads of the fasteners or bolts 18 rest against the inner faces of the inner channels' flanges and the shanks of the fasteners receivably engage wing nuts 20 that engage the outer channels' flanges in order to adjust the inner and outer channels relative to each other.

A pair of ears 22 are fixed to the web portion of the inner channel 12 and slidably receive the upper legs 24 of a pair of U-shaped guide and support members 26. Set screws 28 threaded to the blocks or ears 22 bear against the legs 24 to adjust the members 26 laterally of the base member 10.

Figure 3:
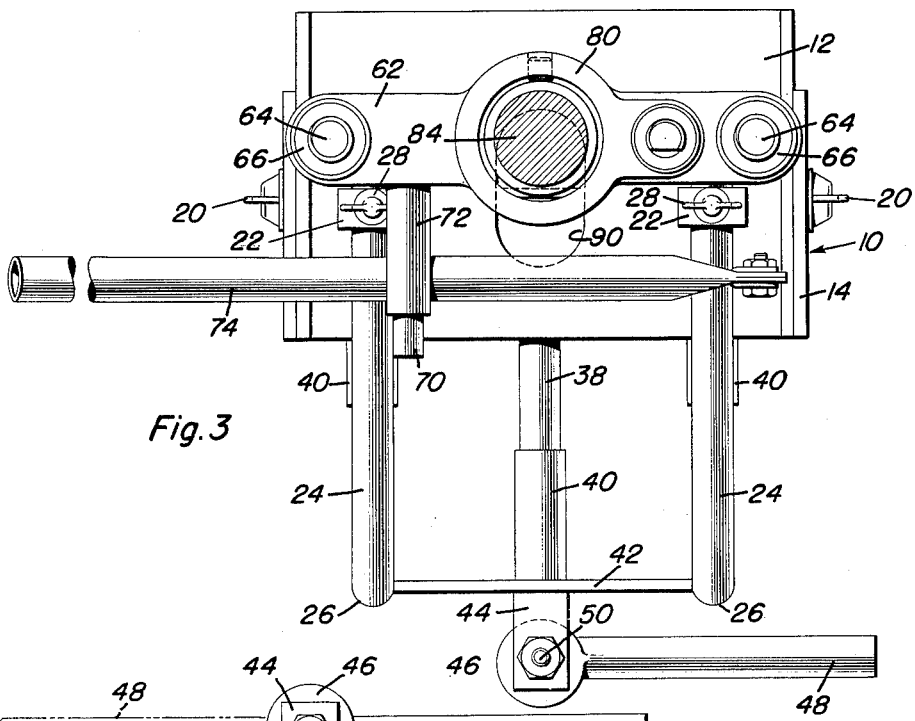
Figure 3 is a top plan view of Figure 1.

A clamping member or plate 30 parallels a flanged portion 32 depending from the web portion of the channel 12 and supports a pair of spaced parallel guide sleeves or slides 34 that are slidably received on the lower legs 36 of the U-shaped member 26. The central portion of the plate 30 fixedly supports a rod 38 (Figures 3 and 4) that parallels the U-shaped members 26 and which rod is slidably received in a central guide tube 40 carried by a plate 42 whose ends are fixed to the webs of the U-shaped members 26.

Figure 2:
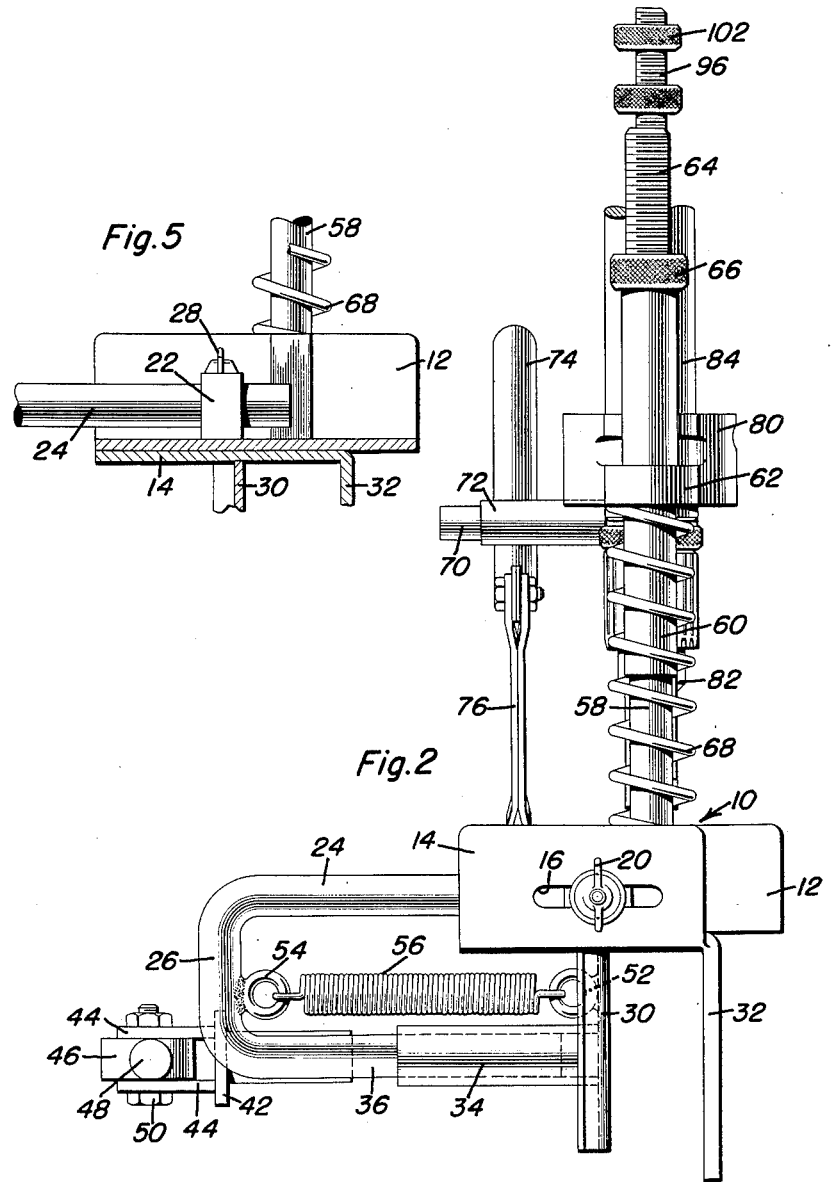
Figure 2 is a side elevational view of Figure 1.

The plate 42 also supports a pair of ears 44 between which is received a cam member 46 having a handle or operating lever 48. The member 46 is removably secured to and between the ears 44 by a pivot 50 that is disposed perpendicular to the rod 38 and the members 26. The outer end of the rod 38 projects forwardly through the plate 42 and is engaged by the cam member 46. The plate 30 supports eyes 52 and the webs of the members 26 also support eyes 54 (Figure 2). Coil springs 56 are terminally secured to the eyes 52 and 54 and yieldingly urge the plate 30 from the flanged portion 32.

Posts 58 rise from the inner channel 12 and enter sleeves or tubes 60 that project through a guide 62. The upper threaded ends 64 support stop washers or nuts 66 that limit upward sliding movement of the guide 62 on the posts 58. Coil springs 68 embrace the posts 58 and the lower ends of the tubes 60 and are biased between the side flanges of the channels 12, 14 and the undersurface of the guide 62 to resiliently support the guide and urge the guide from the base member.

A pin 70 projects laterally from the guide 62 and parallels the rod 38 and the members 26. The pin 70 extends through a transverse sleeve 72 that is welded intermediate the ends of a rock lever 74 to permit rocking of the lever 74 toward and away from the base member 10. Links 76 are terminally pivoted to one end of the lever 74 and to an arm 78 rising from the web portion of channel 12 so that as the free end of the lever 74 is lowered the guide 62 will be lowered toward the base member 10.

The guide 62 is formed with a central hub or collar portion 80 through which extends the chuck portion 82 of a mortising machine tool holder 84. The tool 86 mounted in the chuck 82 extends through the web of a U-shaped guide 88 depending from the main guide 62 and the tool also extends through registering openings 90 (Figures 3 and 4) in the web portions of the channels 12 and 14.

An ear 92 (Figure 1) projects radially from the collar 80 and receives the lower externally threaded reduced end 94 of an externally threaded upright 96. The upright 96 is formed with a flat face 98 having graduations 100 thereon. The gauge 96, 98, 100 receivably engages a pair of stop nuts 102 and 104.

Figure 4:
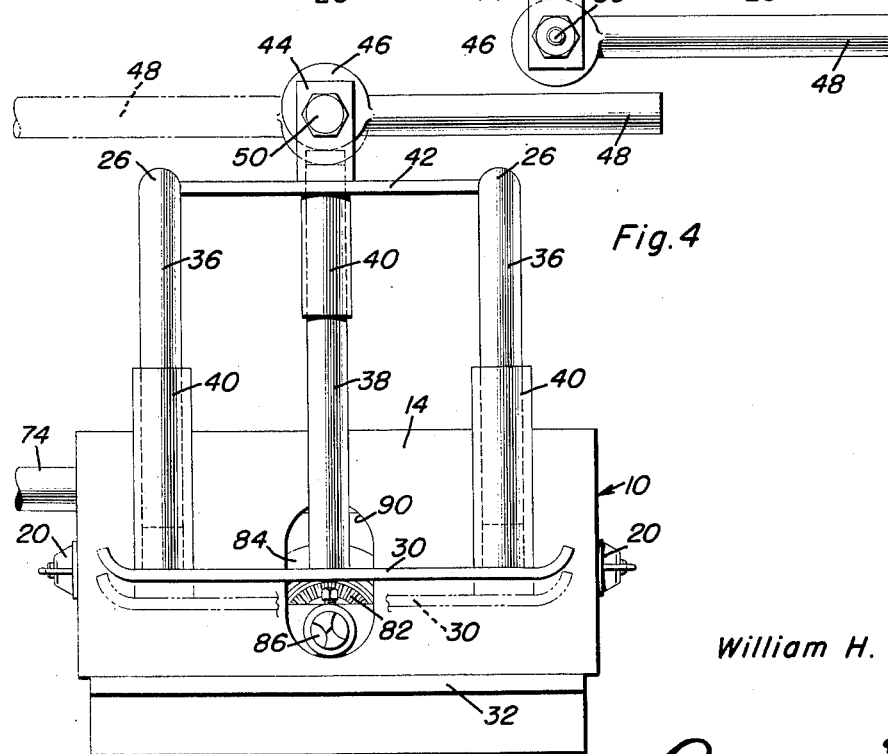
Figure 4 is a bottom plan view of Figure 3 and with dotted lines showing the clamping member and its operator moved to a position for clamping the device upon a work piece.

In practical use of the present invention, the work piece is placed against the flanged portion 32 and beneath the base member 10. The handle 48 is moved to its dotted line position as shown in Figure 4 whereupon the cam member 46 will engage the outer end of rod 38 to force the plate 30 against the article of work to clamp the latter between the flanged portion 32 and the plate 30.

As the lever 74 is lowered, the guide 62 and the tool 86 will be lowered until the tool 86 engages the work piece.

In view of the foregoing description taken in conjunction with the accompanying drawings it is believed that a clear understandig of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of th invention as herein described and the scope of the appended claims.

Having described the invention, what is claimed as new is:

1. A centering device for mortising machines comprising a base member composed of first and second superimposed horizontal plates, means slidably adjustably connecting the plates, a flange depending from one plate, a horizontal guide slidably adjustably carried by the other plate, a clamping plate slidably carried by the guide and movable horizontally toward and away from said flange, posts fixed to and extending upwardly from said other plate, and a spring raised tool holder slidably carried by the posts and overlying the base member.

2. A centering device for mortising machines comprising upper and lower superimposed horizontal plates, means slidably adjustably connecting said plates, a pair of U-shaped horizontally disposed guides having upper and lower leg portions, said upper leg portions being secured on said upper plate and said lower leg portions underlying said lower plate, a horizontal clamping plate slidably supported on said lower leg portions, a flange depending from the lower plate paralleling the clamping plate, means supported by said guides and engageable with said clamping plate for moving the latter toward the flange, posts extending upwardly from the upper plate, said upper plate being adjustable on said lower plate to space the posts horizontally from the flange, whereby a tool supported by a guide slidably received on the posts will be centered with respect to the two faces of a piece of work engaged by the flange and the clamping plate.

3. A centering device for mortising machines comprising upper and lower superimposed horizontal plates having central registering openings for accommodating a tool, said plates being slidably adjustably connected, a flange depending from the lower plate, a horizontal guide slidably adjustably attached to the upper plate and adjustable toward and away from the flange, a clamping plate slidably supported by the guide and disposed under the lower plate, said clamping plate being movable selectively toward and away from the flange to coact with the flange in clampingly engaging a piece of work, a vertical guide secured to and extending upwardly from the upper plate, and a tool holder slidably and nonrotatably carried by the vertical guide and movable toward and away from the plates, said upper and lower plates being adjusted relative to each other by the first named means to space said vertical axis horizontally a predetermined distance from said flange.

4. A centering attachment for mortising machines comprising upper and lower channels each having upstanding end flanges, said upper channel being received within said lower channel, means carried by the flanges slidably adjustably connecting the channels for lateral adjustment of one channel relative to the other, a rigid flange depending from the lower channel and disposed perpendicular to the end flanges, a horizontal guide horizontally slidably and adjustably attached to the upper channel and adjustable toward and away from said rigid flange, a horizontally slidable clamping member carried by the guide and movable toward and away from the rigid flange, a pair of vertical guide posts fixed to and extending upwardly from the upper channel, and a tool holder slidably carried by the posts and movable selectively toward and away from said channels.

5. A centering attachment for mortising machines comprising upper and lower channels each having upstanding end flanges, said upper channel being received within said lower channel, means carried by the flanges slidably adjustably connecting the channels for lateral adjustment of one channel relative to the other, a rigid flange depending from the lower channel and disposed perpendicular to the end flanges, a pair of U-shaped horizontal guide members disposed perpendicular to the rigid flange and having upper and lower leg portions, means slidably adjustably securing the upper leg portions to said upper channel for adjustment of said guide members laterally of said rigid flange, the lower leg portions underlying the channels and extending toward said rigid flange, a clamping member underlying said channels and having means slidably received on said lower leg portions, said clamping member being movable selectively toward and away from said rigid flange, vertically disposed guide means extending upwardly from and attached to said upper channel, and a tool holder slidable vertically on said vertically disposed guide means, said channels being adjusted relative to each other to space said rigid flange horizontally a predetermined distance from the axis of said vertically disposed guide means.

WILLIAM H. JONES.

REFERENCES CITED

The following references are of record in the file of this patent:

UNITED STATES PATENTS

| Number | Name | Date |
|---|---|---|
| 431,381 | Montgomery | July 1, 1890 |
| 513,348 | Thoden | Jan. 23, 1894 |
| 1,356,528 | Johnson | Oct. 26, 1920 |
| 1,403,241 | Halverson | Jan. 10, 1922 |
| 1,449,083 | Billingsley | Mar. 20, 1923 |
| 1,580,412 | Collins | Apr. 13, 1926 |
| 1,762,457 | Uhrin | June 10, 1930 |
| 2,106,112 | Bonato | Jan. 18, 1938 |
| 2,316,073 | Kellogg | Apr. 6, 1943 |

FOREIGN PATENTS

| Number | Country | Date |
|---|---|---|
| 2,343 | Great Britain | Sept. 5, 1871 |
| 540,870 | Germany | Dec. 28, 1931 |
| 518,793 | Great Britain | Mar. 7, 1940 |